United States Patent
Malik et al.

[11] Patent Number: 6,026,980
[45] Date of Patent: Feb. 22, 2000

[54] ONE-PIECE BLOW-MOLDED CLOSED PLASTIC DRUM WITH HANDLING RING AND METHOD OF MOLDING SAME

[75] Inventors: John H. Malik, Naperville, Ill.; John J. Mikula, Kennesaw, Ga.; Robert A. Julien, Naperville, Ill.

[73] Assignee: Greif Bros. Corp. of Ohio, Inc., Delaware, Ohio

[21] Appl. No.: 09/310,894

[22] Filed: May 12, 1999

Related U.S. Application Data

[63] Continuation of application No. 08/312,710, Sep. 27, 1994, abandoned.

[51] Int. Cl.[7] .................................................... B65D 90/00
[52] U.S. Cl. .................. 220/604; 220/4.05; 220/606; 220/DIG. 1
[58] Field of Search ................................. 220/604, 606, 220/634, 4.05, DIG. 1

[56] References Cited

U.S. PATENT DOCUMENTS

| | | |
|---|---|---|
| D. 200,842 | 4/1965 | Baranano . |
| D. 230,956 | 3/1974 | Bystedt et al. . |
| D. 287,461 | 12/1986 | Bussell . |
| D. 295,108 | 4/1988 | Pryztulla . |
| D. 319,133 | 8/1991 | Pryztulla . |
| D. 319,134 | 8/1991 | Pryztulla . |
| 997,556 | 7/1911 | Hoyer . |
| 2,124,565 | 7/1938 | Goll et al. . |
| 2,132,722 | 10/1938 | Coakley . |
| 2,146,381 | 2/1939 | Rheem . |
| 2,673,010 | 3/1954 | Barrow . |
| 2,686,610 | 8/1954 | Sharpnack, Sr. . |
| 2,711,264 | 6/1955 | Benson . |
| 2,936,481 | 5/1960 | Wilkalis et al. . |
| 2,936,489 | 5/1960 | Sherman . |
| 2,975,931 | 3/1961 | Harrison . |
| 3,004,285 | 10/1961 | Hagen . |
| 3,050,773 | 8/1962 | Hagen . |
| 3,170,568 | 2/1965 | Carter . |
| 3,214,797 | 11/1965 | Ollier et al. . |
| 3,250,429 | 5/1966 | Gesell . |
| 3,294,271 | 12/1966 | Armbruster . |
| 3,298,514 | 1/1967 | Erickson . |
| 3,342,915 | 9/1967 | Wanderer . |
| 3,348,721 | 10/1967 | Trevarrow, Jr. . |
| 3,516,571 | 6/1970 | Roper et al. . |
| 3,561,629 | 2/1971 | Turner . |
| 3,647,110 | 3/1972 | Hammes . |
| 3,650,653 | 3/1972 | Erickson . |

(List continued on next page.)

FOREIGN PATENT DOCUMENTS

| | | |
|---|---|---|
| A-0 177 351 | 4/1986 | European Pat. Off. . |
| U-87 16 657 | 3/1988 | Germany . |
| WO-A-94 12409 | 11/1992 | WIPO . |

OTHER PUBLICATIONS

European Search Report; EP 99 10 2026; Mar. 26, 1999.

*Primary Examiner*—Steven Pollard
*Attorney, Agent, or Firm*—Vorys, Sater, Seymour and Pease LLP

[57] ABSTRACT

A one-piece blow-molded closed plastic drum having an integrally-formed compression-molded handling ring and method of molding same is provided. The drum has structural strength and stability to resist breakage of the drum upon impact due to tipping or dropping of the drum. The drum includes a generally cylindrical body portion and a head portion integrally-molded with an upper end of the body portion including a transition area around and between the upper end of the body portion and a top of the drum in the head portion. The transition area has an outside curved surface of a predetermined radius so that an outside surface of the body portion is positioned in a tangential plane in close proximity to a tangential plane along the outer circumferential surface of the handling ring and/or an inside curved surface with at least one radius, preferably a double ogee with three predetermined radii, so that no acute angles are formed between inside surfaces at the transition area.

9 Claims, 7 Drawing Sheets

U.S. PATENT DOCUMENTS

| | | |
|---|---|---|
| 3,501,047 | 3/1970 | Raabe . |
| 3,804,289 | 4/1974 | Churan . |
| 3,821,344 | 6/1974 | Peters . |
| 3,825,145 | 7/1974 | Reynolds . |
| 3,840,041 | 10/1974 | McMurray . |
| 3,843,005 | 10/1974 | Uhlig . |
| 3,889,839 | 6/1975 | Simon et al. . |
| 3,912,438 | 10/1975 | Padovani . |
| 3,927,790 | 12/1975 | Chase et al. . |
| 3,934,747 | 1/1976 | Needt . |
| 3,938,687 | 2/1976 | Maier et al. . |
| 3,949,034 | 4/1976 | Uhlig . |
| 3,955,705 | 5/1976 | Dubois et al. . |
| 3,985,257 | 10/1976 | Shaffer et al. . |
| 4,023,679 | 5/1977 | Hammes . |
| 4,033,473 | 7/1977 | Raley et al. . |
| 4,088,239 | 5/1978 | Uhlig . |
| 4,094,432 | 6/1978 | Zilbert . |
| 4,117,062 | 9/1978 | Uhlig . |
| 4,169,537 | 10/1979 | Sabreen et al. . |
| 4,170,623 | 10/1979 | Dubois et al. . |
| 4,171,751 | 10/1979 | Schütz . |
| 4,201,306 | 5/1980 | Dubois et al. . |
| 4,209,104 | 6/1980 | Speas . |
| 4,228,122 | 10/1980 | Hammes . |
| 4,228,911 | 10/1980 | Hammes ........................... 220/606 X |
| 4,231,488 | 11/1980 | Ward et al. . |
| 4,257,527 | 3/1981 | Snyder et al. . |
| 4,264,016 | 4/1981 | Speas . |
| 4,294,374 | 10/1981 | Ames . |
| 4,372,458 | 2/1983 | Carlson . |
| 4,378,328 | 3/1983 | Przytulla et al. . |
| 4,380,303 | 4/1983 | Allen et al. . |
| 4,385,709 | 5/1983 | Ames . |
| 4,412,628 | 11/1983 | Whitney . |
| 4,489,847 | 12/1984 | Ames ........................... 220/DIG. 1 X |
| 4,500,007 | 2/1985 | Stoll, III . |
| 4,525,401 | 6/1985 | Pocock et al. . |
| 4,540,544 | 9/1985 | Jakobsen et al. . |
| 4,643,323 | 2/1987 | Schütz . |
| 4,648,522 | 3/1987 | Wise . |
| 4,674,648 | 6/1987 | Przytulla . |
| 4,680,068 | 7/1987 | Hofstetter et al. ................. 220/4.05 X |
| 4,713,207 | 12/1987 | Udell et al. . |
| 4,736,862 | 4/1988 | Hammes et al. . |
| 4,767,021 | 8/1988 | Pies . |
| 4,768,673 | 9/1988 | Przytulla . |
| 4,823,683 | 4/1989 | Meisner . |
| 4,840,289 | 6/1989 | Fait et al. . |
| 4,849,154 | 7/1989 | Masumoto . |
| 4,898,296 | 2/1990 | Burgdorf et al. . |
| 4,903,853 | 2/1990 | Masumoto . |
| 4,925,049 | 5/1990 | Przytulla . |
| 4,962,863 | 10/1990 | Wendling et al. . |
| 4,972,963 | 11/1990 | Guarriello et al. . |
| 5,018,642 | 5/1991 | Przytulla ................. 220/675 |
| 5,033,639 | 7/1991 | Przytulla ................. 220/604 |
| 5,044,510 | 9/1991 | Schutz ................. 220/4.05 |
| 5,273,181 | 12/1993 | Gay ................. 220/4.05 X |
| 5,425,454 | 6/1995 | Przytulla et al. ................. 220/4.05 X |

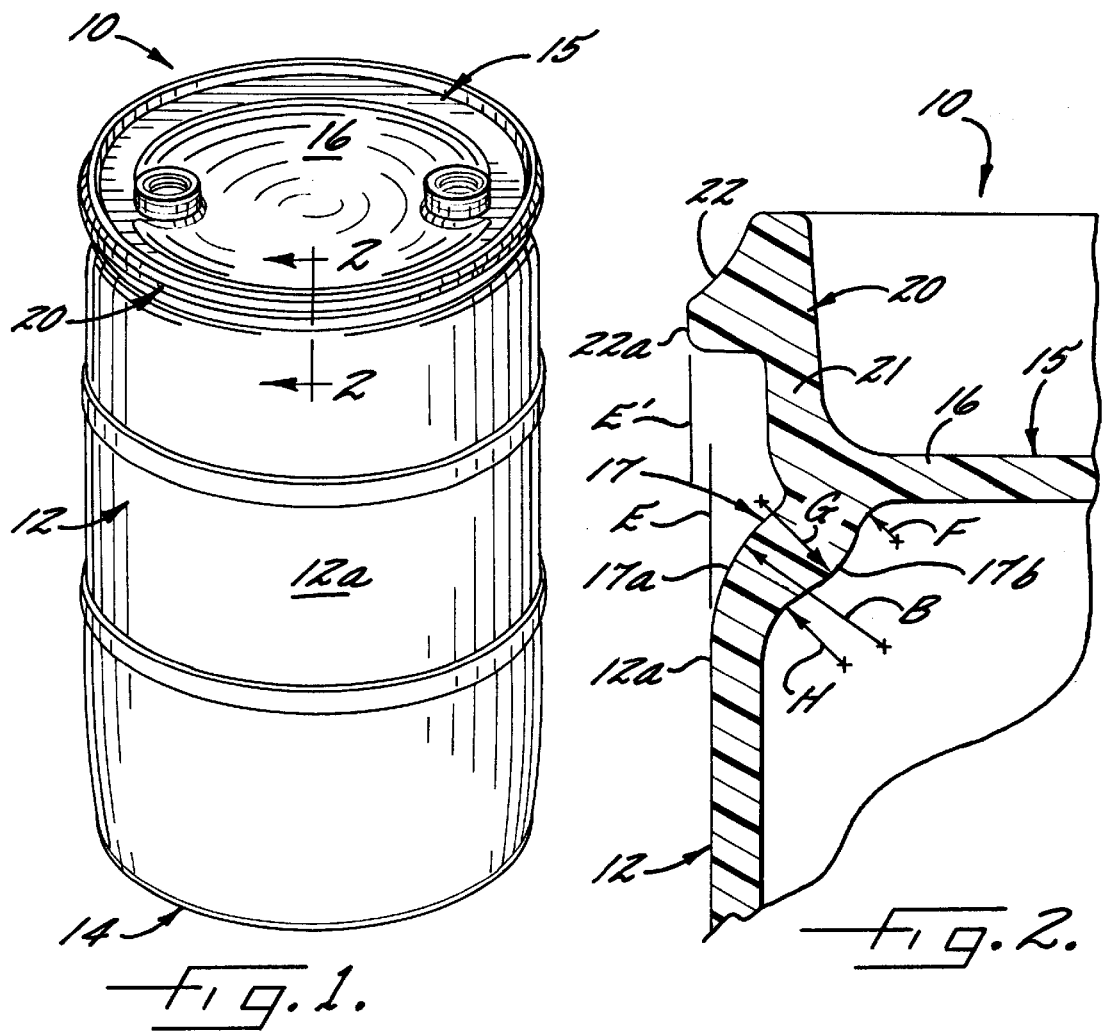
Fig. 1.
Fig. 2.
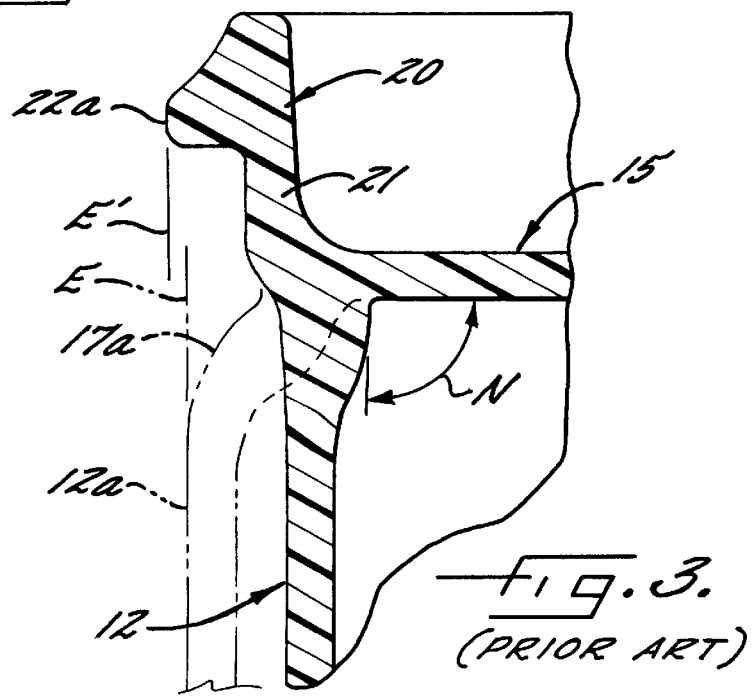
Fig. 3. (PRIOR ART)

ONE-PIECE BLOW-MOLDED CLOSED PLASTIC DRUM WITH HANDLING RING AND METHOD OF MOLDING SAME

This application is a continuation of Ser. No. 08/312,710 filed Sep. 27, 1994 now abandoned.

FIELD OF THE INVENTION

This invention relates to a one-piece blow-molded closed plastic drum having an integrally-formed compression-molded handling ring and method of molding same which provides a drum construction having structural strength and stability to resist breakage of the drum upon impact due to tipping or dropping of the drum which would compromise safety in storing and transporting materials including hazardous liquids in such drum.

BACKGROUND OF THE INVENTION

Various liquids, including hazardous liquid materials, are often stored and transported in drums, particularly drums of the 55 gallon type. Drums utilized for transporting of hazardous liquid materials are subject to rules and regulations of governmental regulatory bodies, such as the Department of Transportation in the United States. These rules and regulations require drum constructions to withstand breakage during drop and tip tests.

A 55 gallon drum can weigh as much as 880 pounds under acceptable regulations and it is therefore necessary for the manufacturer to provide the user with some means of moving the drum. The steel drum industry has developed a device called a "parrot beak" lifting device, which acts like a parrot's beak and squeezes the top chime or handling ring of a drum enough that it will not slip when the drum is lifted using the device. The device acts by both compressing the handling ring between its jaws as well as digging into its surface. Steel drums are more and more frequently being replaced by plastic drums throughout the industry for various reasons well known to those in this industry. The same parrot beak lifting device is the tool of choice for handling and lifting of filled plastic drums.

Heretofore, there have been several manufacturing methods utilized in providing plastic drums with a parrot beakable handling ring. One such manufacturing method is to shrink-fit a plastic ring onto a blow-molded plastic drum so tightly that, given the weight placed in the drum, it will not slip off because the compressive forces on the drum/ring interface are so large that they overcome the stresses of lifting the assembly via the ring. Other manufacturing methods have included injection molding an entire drum head with an integral handling ring and then sonic welding or hot plate welding such injection molded drum head onto a blow-molded or otherwise formed drum, thus yielding a closed drum with an integral handling ring for transporting liquid hazardous material. Problems have been presented with both these types of drums and manufacturing processes from an economic standpoint and from the standpoint of providing a construction which will satisfactorily withstand breakage due to forces created during dropping or tipping of a filled drum.

A further preferred manufacturing method for such a plastic drum with a handling ring would include blow-molding of a drum having a closed head with an integral handling ring extending therefrom and formed by being compression-molded through the use of an articulating section in the blow mold. Such blow-molded drums with compression-molded handling rings have also suffered from problems relating to breakage of the drum upon impact during dropping or tipping of a filled drum. The blow-molding processing considerations heretofore utilized have not taken into account stresses caused by such dropping or tipping. Specifically, current designs of drums and their manufacturing processes do not consider the effects of the flow of plastic material inside the drum during compression-molding ring formation processes, which creates stress concentrations which limit the usefulness of the drum and resistance to breaking during dropping or tipping. Stress concentration points are created due to the flow of residual materials from the compression-molding of the integral handling ring unless the direction of flow and the location of the resultant extrudate is carefully controlled. Also, current drum designs place the outside surface of the handling ring outwardly of the outside surface of the drum body which causes an inordinate amount of force on the handling ring when a filled drum is dropped or tipped which causes breakage of the drum particularly at the stress concentration points.

BACKGROUND AND SUMMARY OF THE INVENTION

It is the object of the present invention to overcome the above problems heretofore presented with one-piece blow-molded closed plastic drums having an integral compression-molded handling ring by providing a drum construction and method of manufacturing same which eliminates stress concentrations heretofore formed in such drums and provides a construction which will resist forces on the outside surface of the handling ring causing breakage of the drum due to impact upon dropping or tipping of a filled drum.

It has been found by this invention that the above object may be accomplished by providing a one-piece blow-molded closed plastic drum which includes a generally cylindrical body portion, a bottom integrally-molded with a lower end of the body portion and a head portion integrally-molded with an upper end of the body portion and defining a top and a transition area around and between the upper end of the body portion and the top. The drum has a handling ring integrally-molded with the drum which has a leg extending upwardly from the transition area and a grippable member extending generally outwardly from the upper end of the leg and which is parrot beakable.

In accordance with this invention, the transition area preferably has (1) an outside curved surface of a predetermined radius so that an outside surface of the body portion is positioned in a tangential plane in close proximity to a tangential plane along an outer circumferential surface of the handling ring and/or (2) an inside curved surface with at least one radius, preferably defining a double ogee with three predetermined radii, so that no acute angles are formed between the inside surfaces at the transition area.

With this improved configuration of outside curved surface on the transition area of the drum, the outside surface of the drum body portion will absorb forces of impact on the drum when the drum is dropped or tipped on its side, rather than an inordinate portion of such forces being directed to the handling ring causing extreme flexing thereof and breaking of the drum in the transition area. On the other hand, the above-defined improved inside curved surface on the transition area of the drum results in no acute angles being formed between inside surfaces of the drum in the transition area adjacent to the handling ring. It has been found that acute angular formations between inside surfaces in this transition area caused by the flow of plastic material during compression molding of the handling ring result in the formation of stress concentration points in the molded plastic drum which weaken the drum and cause breakage along such stress concentration points when forces resulting from dropping or tipping of the drum are exerted thereon.

In order to provide one or both of the above desired improved features in the construction of a one-piece blow-molded closed plastic drum with an integral compression-molded handling ring, it has been found that a method of molding should include the following steps. A blow-mold having an interior surface of the desired dimensions and shape of the drum to be molded which includes a cylindrical body portion and a head portion on the end of the body portion and connected thereto by a transition area is provided. The mold is designed to form a drum in upside-down position. Such mold should include an articulating section to blow mold the head portion and to form by compression a solid handling ring integrally-extending axially and radially outwardly from the transition area of the drum. The interior surface of the mold preferably has a shape to mold a drum having an outside curved surface of a predetermined radius on the transition area so that the outside cylindrical surface of the drum is in a tangential plane in generally close proximity to a tangential plane along an outer surface of the handling ring.

A heated plastic parison is provided in the mold. A first blowing operation of the parison is performed, while the mold articulating section is in its open position a predetermined axial distance from the closed position. The first blowing operation is under a predetermined pressure to completely expand the parison into the shape of the inside surface of the mold and to completely fill the open mold articulating section and form an open handling ring.

A second blowing operation is performed under a predetermined pressure, less than the predetermined pressure of the first blowing operation, to stabilize the expanded parison inside the mold. The mold articulating section is closed, during the second blowing operation, in first and second sequences for predetermined different distances of closure at predetermined different speeds while compressing the blow-molded open handling ring into a solid handling ring integral with the drum and forming with extruded plastic an inside curved surface on the transition area of the drum with at least one radius, preferably in the form of a double ogee with three predetermined radii, so that no acute angles are formed between inside surfaces of the top, transition area and body portion of the drum.

A third blowing operation is then performed after the mold articulating section is completely closed at a predetermined pressure higher than the predetermined pressures of the first and second blowing operations for a sufficient length of time to allow cooling of the molded plastic drum.

BRIEF DESCRIPTION OF THE DRAWINGS

While some of the objects, features and advantages of this invention have been given above, other objects, features and advantages will appear in the detailed description of preferred embodiments to follow, when taken in conjunction with the accompanying drawings, in which:

FIG. 1 is a perspective view of a one-piece blow-molded closed plastic drum having an integral compression-molded handling ring constructed in accordance with this invention;

FIG. 2 is an enlarged partial sectional view taken through the drum of FIG. 1 and along the line 2—2 of FIG. 1;

FIG. 3 is a partial sectional view, like FIG. 2, but illustrating the prior art construction of this type of drum and showing the improved new construction features in phantom lines;

DETAILED DESCRIPTION OF PREFERRED EMBODIMENTS OF THE INVENTION

Figure 4:
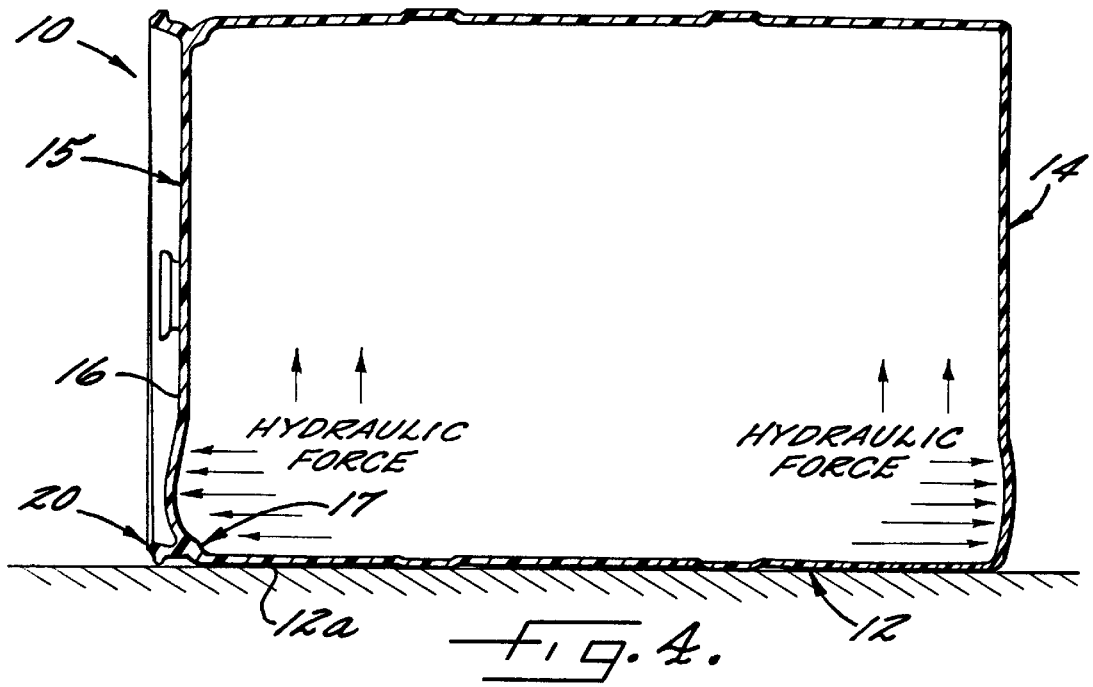
FIG. 4 is a sectional view through the drum of FIG. 1 and showing such drum in position after it has been tipped or dropped onto a flat surface and showing force vectors resulting from hydraulic forces produced as a result of such tipping or dropping of a filled drum onto its side.

Referring now to the drawings, a one-piece blow-molded closed plastic drum, generally indicated at 10, is illustrated in FIG. 1. This drum 10 includes a generally cylindrical body portion 12 defining an outer cylindrical surface 12a. A bottom 14 is integrally-molded with a lower end of the cylindrical body portion 12. A head portion 15 is integrally-molded with an upper end of the cylindrical body portion 12 and defines a top 16 and a transition area 17 around and between the upper end of the body portion 12 and the top 16. A handling ring 20 is integrally-molded with the drum 10 and has a leg member 21 extending upwardly from the transition area 17 and a grippable member 22 extending generally outwardly from an upper end of the leg member 21 to define an outer cylindrical surface 22a on the handling ring 22.

The transition area 17 in accordance with this invention preferably has an outside curved surface 17a of a predetermined radius B so that the body portion outside surface 12a is positioned in a tangential plane in close proximity to a tangential plane along the handling ring outside surface 22a, as may be seen by the planes indicated schematically at E and E' in FIG. 2. Said transition area preferably has an inside curved surface 17b defining a double ogee with three predetermined radii F, G and H. For a conventional 55 gallon drum size, it has been determined that a predetermined radius B of about 1.0 inch for the outside drum transition area surface 17a and predetermined radii F, G and H of about 0.5 inch, 1.0 inch and 0.5 inch will provide the desired improvements of this invention.

The above defined construction of a one-piece blow-molded closed plastic drum 10 with integrally-molded handling ring 20 may be contrasted with the more conventional prior art construction of a one-piece blow-molded closed plastic drum with an integrally-molded handling ring as shown in FIG. 3. As shown in that Figure, the transition area between the cylindrical body portion 12 and the top at the head portion 15 of the drum 10 has an outside generally flat surface. The handling ring 20 of this prior art drum 10, because it extends upwardly and outwardly from the transition area, provides an outside surface in a tangential plane which extends a substantial distance outwardly from a tangential plane along the outside surface of the body portion of the drum, as may be clearly seen in FIG. 3. Also, during the molding method, as will be discussed in more detail below, the extrudate from compression molding the handling ring in the prior art construction results in an inside surface on the transition area which forms an acute angle N with the inside surface of the top of the drum, thereby producing a stress concentration at that angle for reasons well understood by those with ordinary skill in the art.

Figure 5:
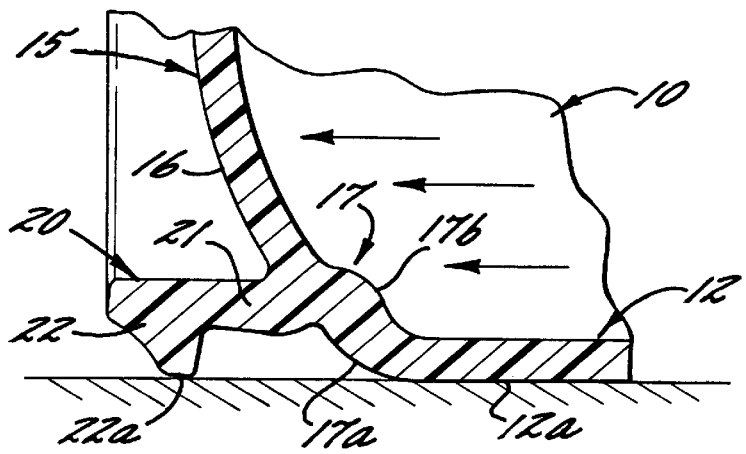
FIG. 5 is an enlarged sectional view through the head portion of the drum and the integrally-molded handling ring extending from a transition area between the top of the drum and the body of the drum of FIG. 4 and showing the effects of dropping or tipping of a filled drum onto a flat surface.
Figure 6:
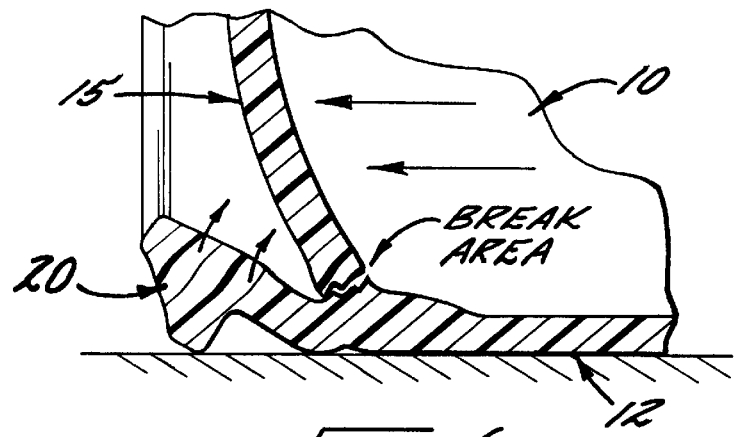
FIG. 6 is a view, like FIG. 5, but of the prior art drum of FIG. 3 and showing the effects of dropping or tipping of a filled prior art drum construction onto a flat surface which results in breaking of the drum through stress concentration points formed in such prior art drum.

Referring now to FIGS. 4 and 5, these Figures illustrate the effects of dropping or tipping a filled drum 10 constructed in accordance with the features described above with respect to FIGS. 1 and 2. FIG. 6 illustrates the effects of dropping or tipping a filled drum 10 constructed in accordance with the prior art construction discussed above with respect to FIG. 3.

In FIGS. 4 and 5, a filled drum 10 has been dropped or tipped onto its side onto a flat surface and the arrows illustrate the force vectors created by the hydraulic forces within the filled drum 10. Since the outside surface 22a is in a tangential plane in close proximity to a tangential plane along the outside surface 12a of the body portion 12 of the drum 10, minimal forces are exerted by flexing of the handling ring 20 when its strikes the surface. Also, stress concentration points in the transition area 17 of the drum 10 are avoided because of the special construction or geometry in the form of a double ogee of the inside surface 17b of the transition area 17 of the drum 10. Both of these features contribute to resisting a breakage of the drum 10 as a result of tipping or dropping of the drum 10 on its side.

By contrast and referring to FIG. 6, it is shown how the handling ring 20 is flexed due to the force of impact against a surface upon dropping or tipping of the filled 10 drum so that these forces cause breaking through a break area at a stress concentration in the transition area of the drum 10 because of the acute angular relationships of the inside surfaces of the plastic material in the prior art drum 10.

In order to manufacture a closed one-piece plastic drum 10 having an integral handling ring 20 having a transition area 17 with the improved outside surface 17a and/or inside surface 17b, described above for the improved resistance to breaking upon tipping or dropping of a filled drum, a blow-molding method of the following type has been found suitable to produce such an improved drum construction. The preferred method to be described hereinafter and the preferred mold construction to be utilized in such method is for construction of a widely used 55 gallon type drum. However, it is to be understood that the principals of the drum construction and method of this invention are applicable to other size drums and may be easily adapted to other size drums by those with ordinary skill in the art.

The preferred method, as disclosed more specifically in FIGS. 7–16 includes providing a blow-mold 30 having an interior surface of the desired dimensions and shape of the drum 10 to be molded, as described above with respect to FIGS. 1 and 2, and an articulating mold section 31 to blow-mold the head portion 15 of the drum 10 and to form by compression an integral solid handling ring 20 of the type described above with respect to FIGS. 1 and 2. The mold 30 is designed to form the drum 10 in upside down position. The blow-mold 30 is preferably axially divided forming spaced halves 30a, 30b and is initially positioned in an open position.

Figure 7:
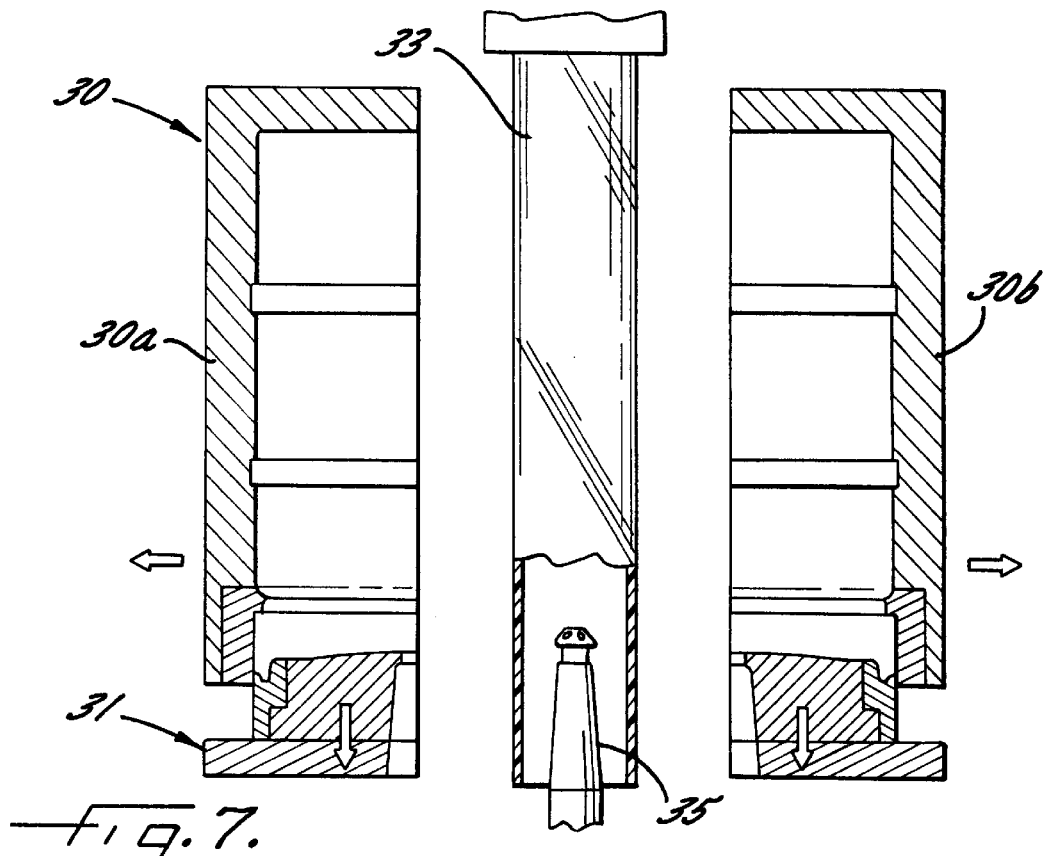
FIG. 7 is a sectional, somewhat schematic view illustrating a beginning step in the manufacturing process of the present invention wherein a heated plastic parison is provided in a blow mold constructed for forming the improved drum of the present invention in upside down position.

A heated plastic parison 33 is provided in the mold 30, preferably by extruding such heated plastic parison between the open mold halves 30a, 30b, as shown in FIG. 7. Extruding of a plastic parison, which is initially longer than the drum to be blow-molded, is an operation well understood by those with ordinary skill in the art and does not need further detailed explanation herein. The plastic parison 33 may be constructed of any thermoplastic material, including but not limited to polyolefins, styrenics, PET, PVC, polycarbonate, ABS, nylon polyphenylenes, polyacetals, polyesters which demonstrates adequate Theological properties which lend themselves to blow molding, and combinations thereof. The parison 33 is preferably heated to approximately 412 degrees F.

Figure 8:
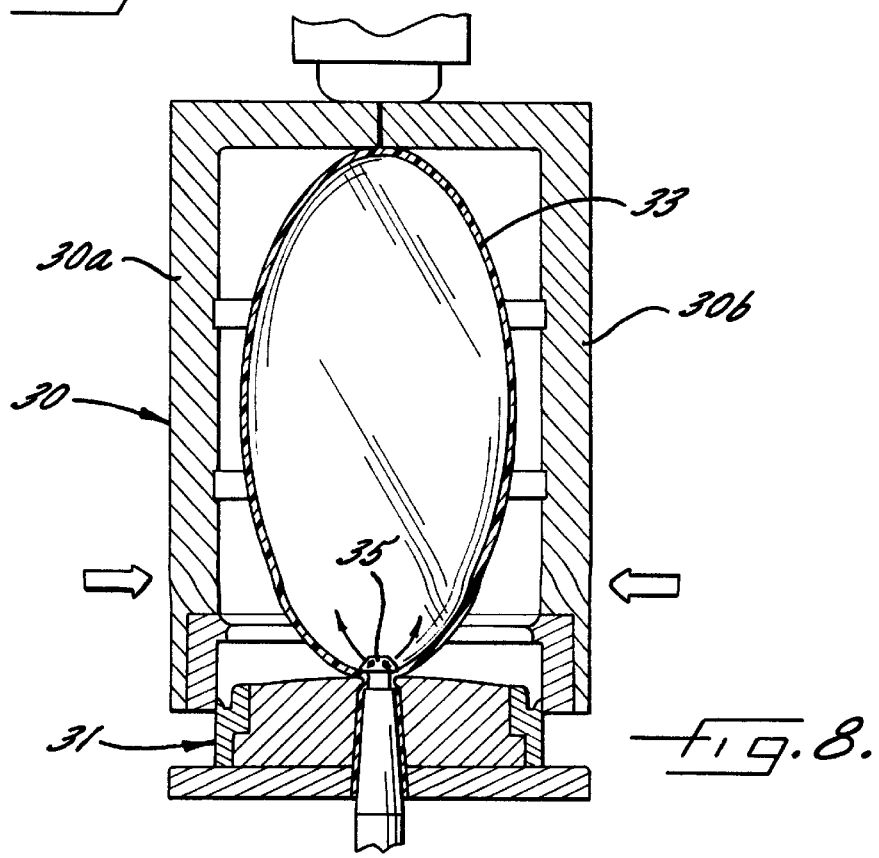
FIG. 8 is a sectional, somewhat schematic view of a next step in forming of the improved drum of this invention wherein a first blowing operation of the parison is being performed.
Figure 9:
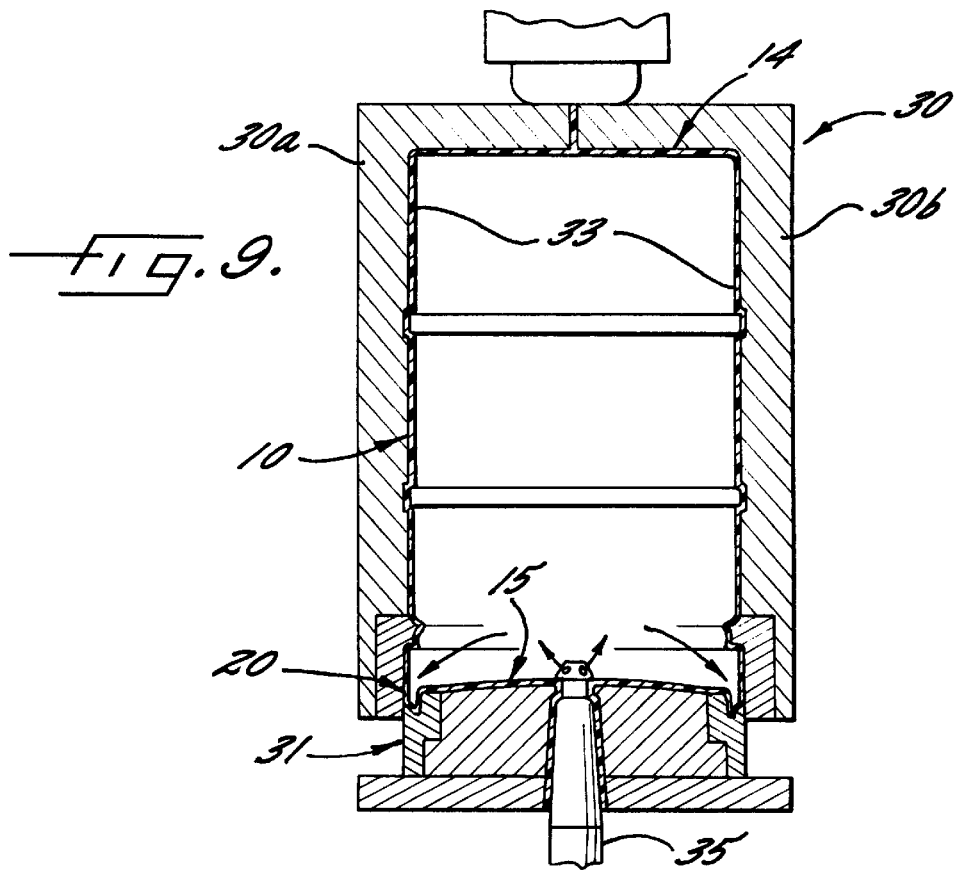
FIG. 9 is a sectional, somewhat schematic view illustrating a further stage of the method of molding a drum in accordance with the present invention and wherein the first blowing operation has completely expanded the parison into the shape of the inside surface of the mold and has completely filled the open mold articulating section to form an open handling ring.
Figure 10:
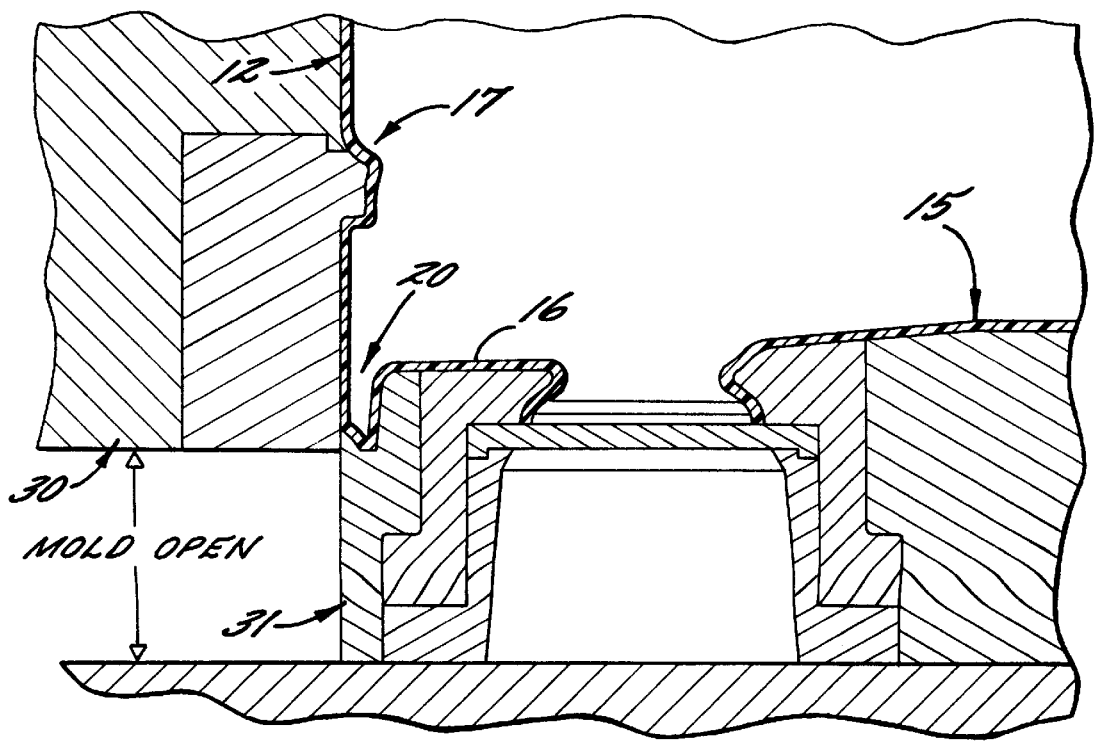
FIG. 10 is an enlarged partial sectional view of a bottom portion of the mold in the position illustrated in FIG. 9 and at the method stage of FIG. 9.
Figure 11:
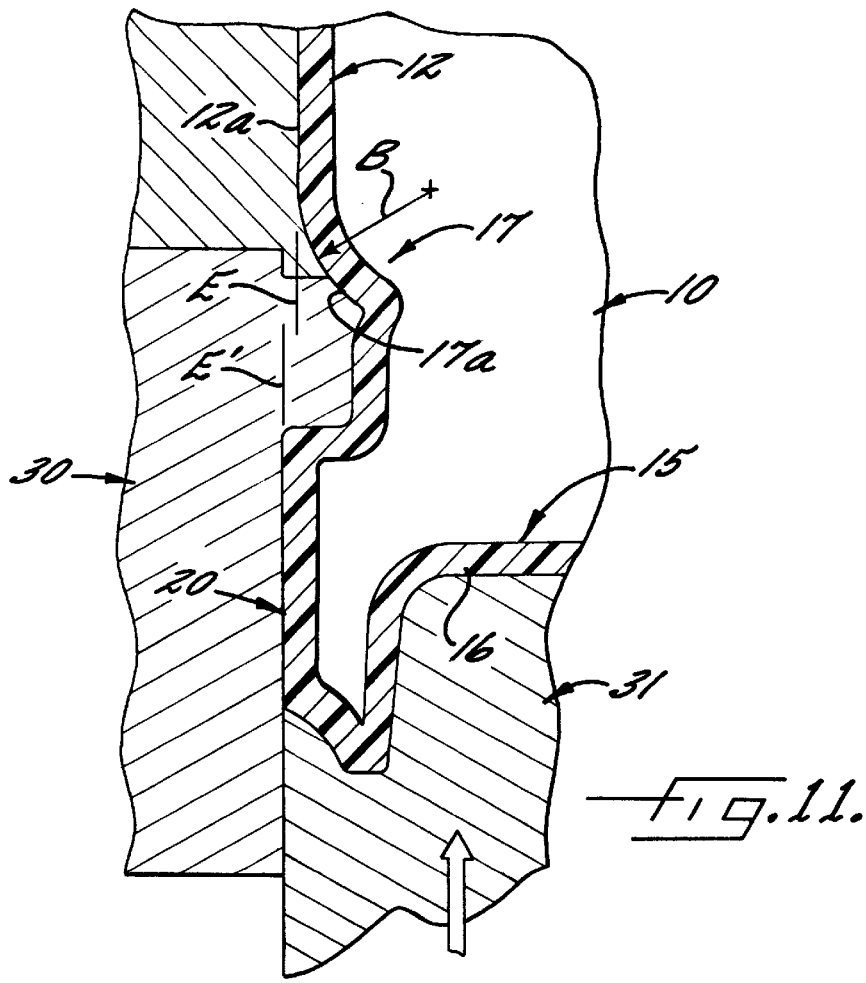
FIG. 11 is a further enlarged partial sectional view showing the articulating section of the mold illustrated in the earlier Figures as it begins closing and during a second blowing operation of the parison.

The method further includes performing a first blowing operation of the parison 33 by blow pins 35 extending into the parison through the articulating section 31 of the mold 30 in a manner well understood by those with ordinary skill in the art. This first blowing operation of the parison 33 is performed while the articulating section 31 is in an open position a predetermined axial distance of at least 2.65 inches from a closed position, as illustrated in FIGS. 7, 8 and 9. This first blowing operation is performed while closing the blow-mold halves 30a, 30b from the position of FIG. 7 to that of FIG. 8 and under a predetermined pressure of about 30–60 PSI to completely expand the parison 33 into the shape of the inside surface of the mold 30 and to completely fill the open mold articulating section 31 and form an open or hollow handling ring 20, as shown in FIGS. 9 and 10.

The minimum open distance of 2.65 inches for the articulating section 31 is important to ensure that enough plastic material from the parison 33 can be expanded into this open articulating mold section 31 to completely fill the handling ring mold surfaces therein, leaving sufficient plastic material to extrude back into the inside surface of the transition area 17 of the drum 10 to form the double ogee curved inside surface 17b as the mold articulating section 31 closes to compression-mold a solid handling ring 20 on the drum 10.

As the parison 33 is extruded into the mold 30 in its open position, it is programmed to adjust the wall thickness to ensure the presence of sufficient plastic material. Once the parison 33 is extruded to the correct length, the first blowing operation is commenced and the mold halves 30a, 30b close to pinch off the parison from the extruding device and provide a closed parison within the mold 30. This first blowing operation is continued until the mold halves are completely closed.

The next step in the method is a second blowing operation on the expanded parison 33 which is conducted under a predetermined pressure, less than the predetermined pressure of the first blowing operation, at about 15–50 psi to stabilize the expanded parison 33 inside the closed mold 33. During this second blowing operation, the mold articulating section 31 is closed in first and second sequences for predetermined different distances and at predetermined different speeds while compressing the blow-molded open handling ring 20 into a solid handling ring 20 integral with the drum 10 and forming with extruded plastic an inside curved surface 17b on the transition area 17 of the drum 10 in the form of a double ogee with three predetermined radii F, G, H.

Prior to activating closing of the mold articulating section 31, a two second delay is provided following complete closure of the mold halves 30a, 30b to give sufficient time to completely expand the parison 33 into the articulating mold section 31 prior to beginning closure thereof. The second blowing operation under the above described pressure stabilizes the parison 33 within the mold 30 as the articulating section 31 is closing.

Failure to use the low pressure of between about 15 to 40 PSI and using a higher pressure of about 50 to 110 PSI can cause several problems to occur. Firstly, the plastic material stretched into the open articulating mold section 31 can rupture, leaving voids in the handling ring 20 or not forming the handling ring 20 at all. Secondly, due to high pressure in the mold 30, compounded with the contraction of the articulating mold section 31 being closed, the air pressure can become too great and cause the mold 30 to open up to relieve the built-up air pressure, leaving a blown-out pinch off area generally on the bottom section of the drum 10.

Closing of the mold articulating section 31 in first and second sequences for predetermined different distances and at predetermined different speeds, along with the shape of the mold surface to provide an outside curved surface 17a having a predetermined radius B at the transition area 17 of the drum 10, causes the flow of the plastic extrudate on the inside of the drum 10 at the transition area 17 during compression molding of the handling ring 20 to assume the curved inside surface 17b in the shape of a double ogee having three predetermined radii P, G, H.

During the first sequence of closing of the mold articulating section 31, the mold is closed approximately 70 percent at a predetermined speed of approximately 1.85 inches per second for a period of 1 second travel time. This initial movement is used in order to quickly gather the blown plastic material in the open handling ring channel filling the outer overhang on the handling ring 20 (see FIG. 11 which shows the articulating head section closed by a distance of ¾ inch). Next, a slower speed of approximately 10–11 percent of the speed of closing during the first sequence is utilized to continue the process of compressing the open handing ring into a solid handling ring 20 and extruding the material to flow out to achieve the desired inside surface 17b geometry on the transition area 17 of the drum 10.

Figure 12:
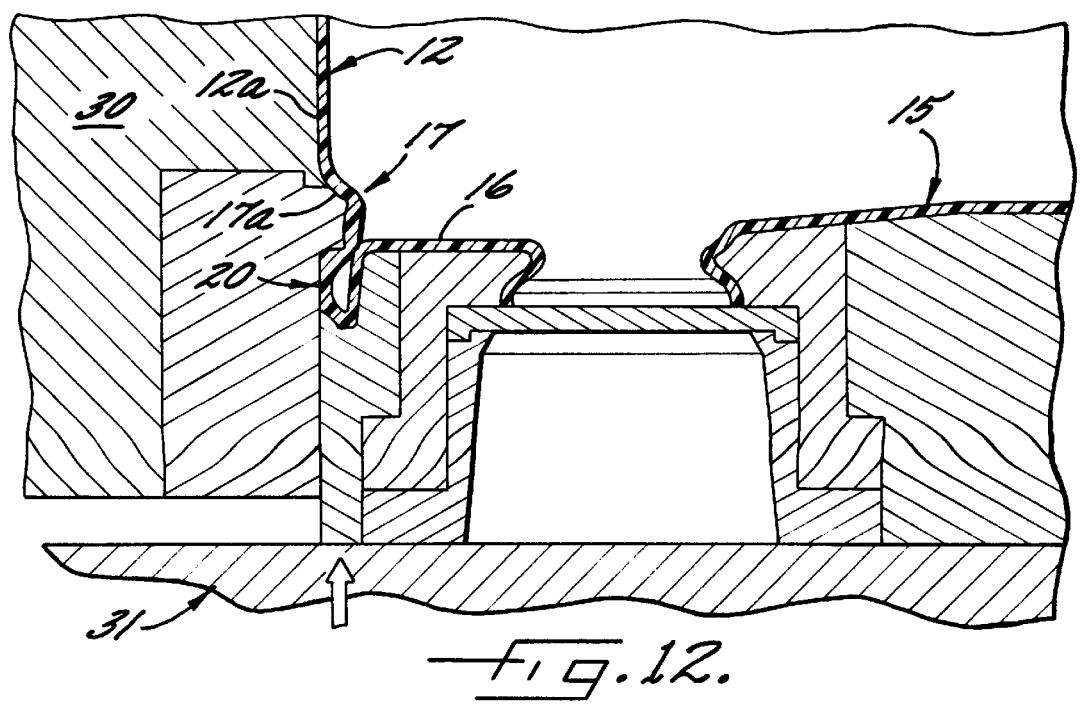
FIGS. 12, 13 and 14 are sectional views which illustrate progressive stages of closing of the articulating section of the mold while compression is molding the handling ring to a solid handling ring from open handling ring.
Figure 13:
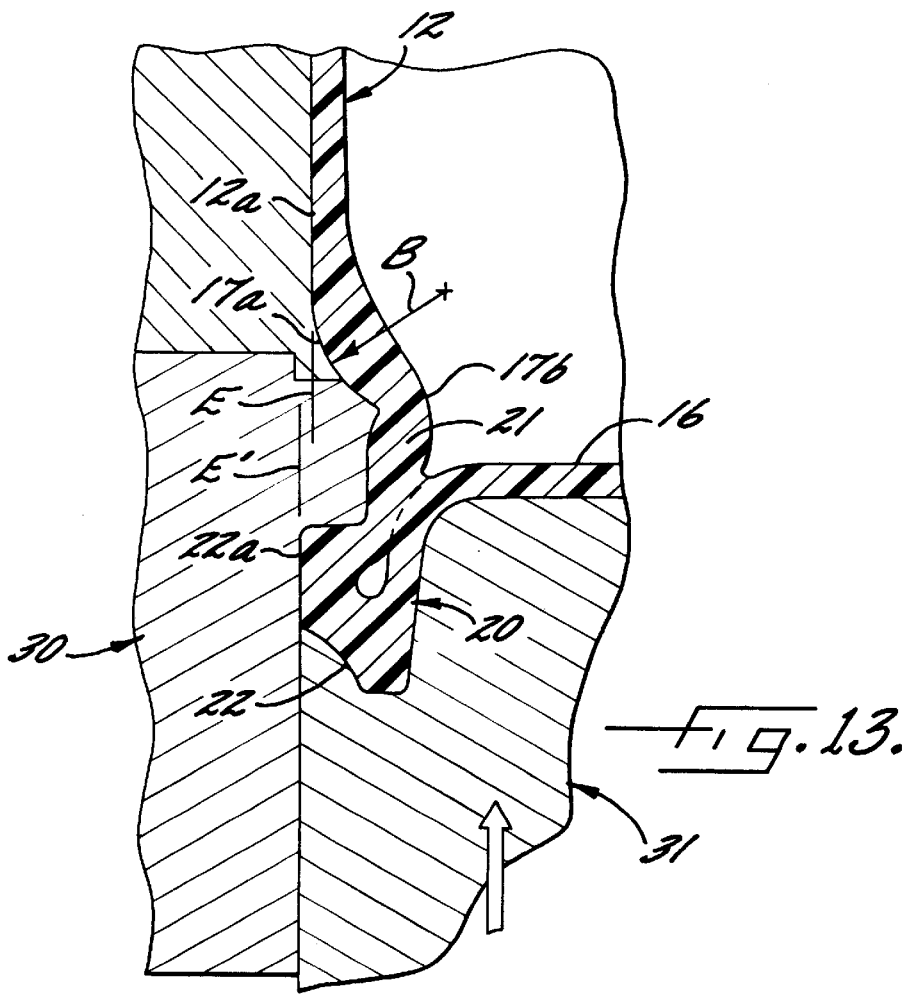
Figure 14:
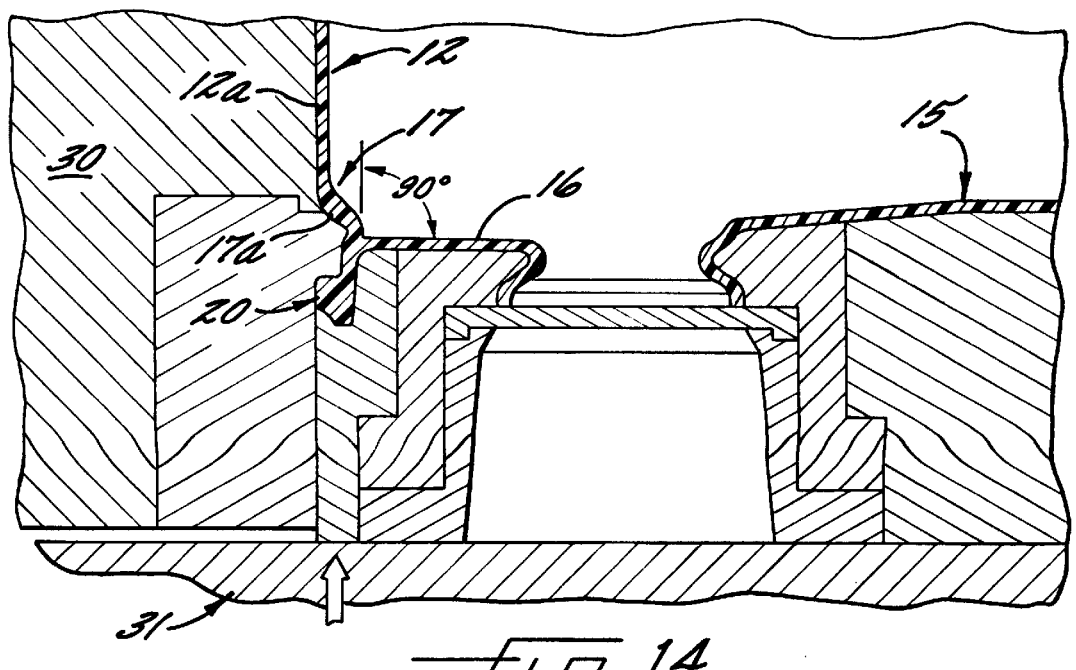
Figure 15:
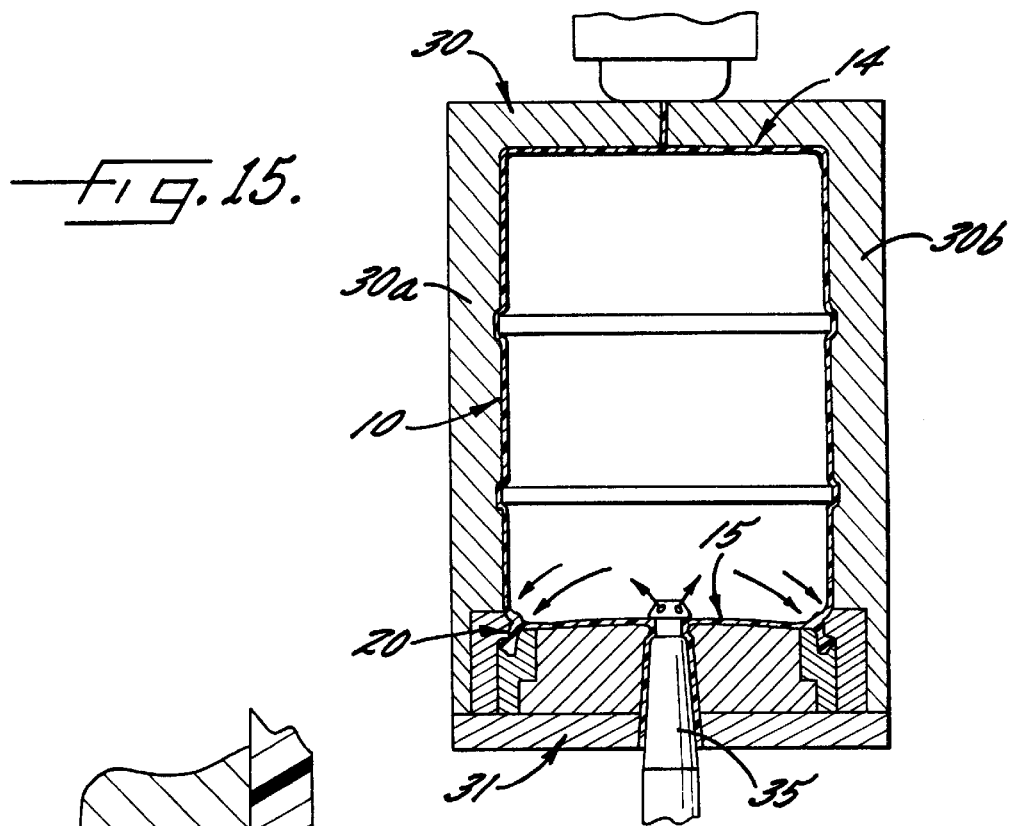
FIG. 15 is a sectional, somewhat schematic view illustrating the mold articulating head section in its fully closed position and wherein a third blowing operation is being performed.
Figure 16:
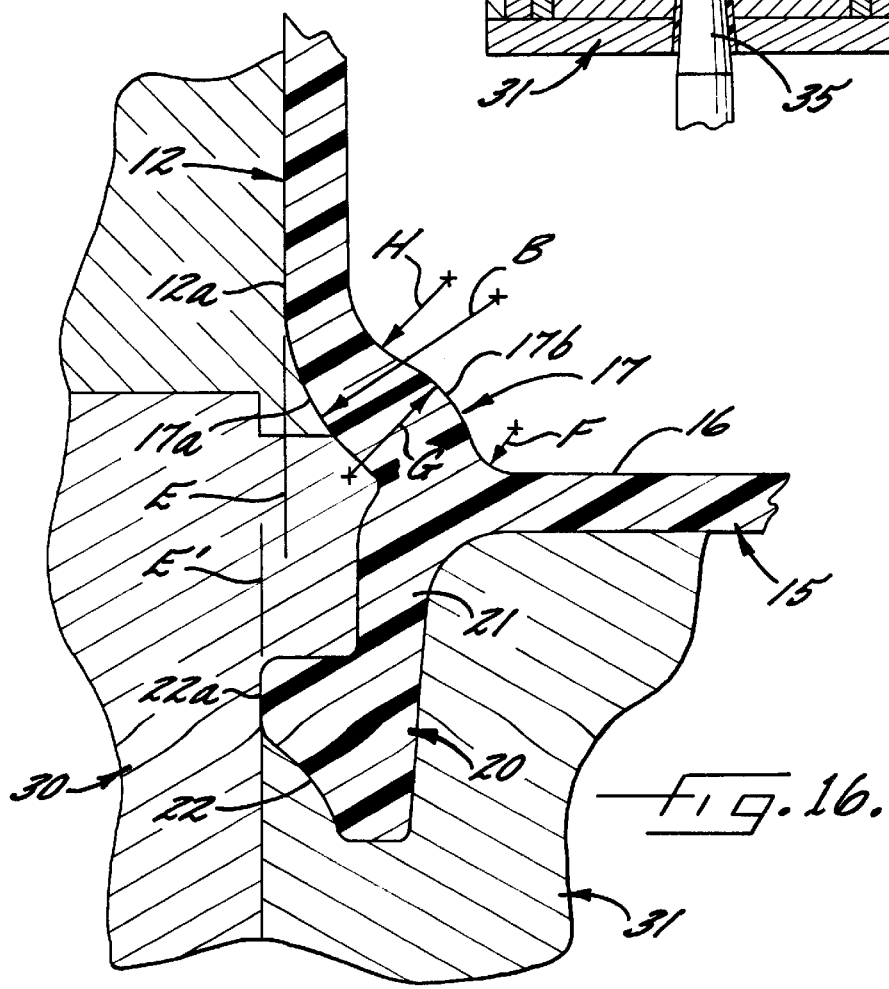
FIG. 16 is an enlarged partial sectional view illustrating the articulating head section in the fully closed position and the resulting compression molded handling ring with the improved features of the outside and inside curved surfaces of the transition area between the body portion and top of the drum.

FIGS. 12, 13, 14 and 15 show the stages of compression molding the open handling ring 20 into a solid handling ring 20 integral with the drum 10 while forming with extruded plastic the inside curved surface 17b on the transition area 17 of the drum 10 in the form of the double ogee with three predetermined radii F, G, H. These views show the articulating mold section 31 stopped at 5 millimeter increments in sequence to better illustrate the actual movement of the plastic material. FIG. 12 shows a cross-section of the handling ring 20 with the articulating mold section 31 about 0.59 inches from being completely closed. At this time the articulating mold section 31 is closing in its second sequence at the slower speed. It should be noted that the outer lip of the handling ring 20 is basically formed and filled from faster movement of the mold section 31 in the first sequence. As the articulating mold head section closes to approximately 0.394 inches from closing, as shown in FIG. 13, the handling ring 20 has joined and a sharp angle is being formed at the intersection of the inside wall surface of the top 16 and the inside wall surface of the transition area 17. In FIG. 14, the articulating mold section 31 is 0.197 inches from full closure and the handling ring 20 is completely filled and free of voids and the angle between the inside wall of the transition area 17 and the top 16 is a virtual 90 degree angle. Finally, during the last and final closure of the articulating mold head section 31 to form the inside surface 17b of the transition area 17 in the double ogee shape, as illustrated in FIG. 16, sufficient material is left to be extruded out to form this desired inner geometry free of all acute angles and stress concentration points associated with them. This double ogee curved inside surface 17b on the transition area 17 provides strength and flexibility in this critical section of the drum 10 to resist fracture during dropped or tipped impact.

The molding method concludes with a third blowing operation after the mold articulating section 31 is completely closed at a predetermined pressure higher than the predetermined pressures of the first and second blowing operation of about 90–110 PSI for a sufficient period of time to allow cooling of the molded plastic drum 10. Following cooling, the mold halves 30a, 30b may be opened up along with the mold articulating section 31 and the molded drum 10 removed from the mold 30.

Thus, this invention has provided an improved one-piece blow-molded closed plastic drum 10 having an integrally-formed compression-molded handling ring 20 wherein a transition area 17 around and between the upper end of a cylindrical body portion 12 and the top 16 of the drum 10 has an outside curved surface 17a of a predetermined radius B so that an outside surface 12a of the body portion 12 is positioned in a tangential plane E in close proximity to a tangential plane E' along an outer circumferential surface 22a of the handling ring 20 and/or the transition area 17 has an inside curved surface 17b defining a double ogee with three predetermined radii F, G, H so that no acute angles are formed between inside surfaces.

With this construction, the outside surface 12a of the drum body portion 12 will absorb forces of impact on the drum 10 when the drum 10 is dropped or tipped, rather than an inordinate portion of such forces being directed to the handling ring 20 causing a breaking of the drum 10 in the transition area 17. Also, the improved inside curved surface 17b on the transition area 17 of the drum results in no acute angles being formed between inside surfaces of the drum 10 in the transition area 17 adjacent to the handling ring 20 avoiding the formation of stress concentration points in the molded plastic drum 10 which weaken the drum and cause breakage along such stress points when forces resulting from dropping or tipping of the drum 10 are exerted thereon.

The improved molding method for this drum construction 10 includes steps which ensure the flow of plastic material in an extrudate along the inside surface 17b of the transition area 17 from an open blow-molded handling ring 20 as the open blow-molded handling ring 20 is compression-molded into a solid handling ring 20 due to method conditions during the compression molding and due to the shape of the drum being molded so that the extrudate will form the improved inside curved surface 17b on the drum.

The invention has been described in considerable detail with respect to its preferred embodiments. However, variations and modifications can be made within the spirit and scope of the invention as described in the foregoing specification and as defined in the following claims.

What is claimed is:

1. A one-piece blow-molded closed plastic drum comprising:
   a generally cylindrical body portion defining an outer cylindrical surface;
   a bottom integrally-molded with a lower end of said cylindrical body portion;
   a head portion integrally-molded with an upper end of said cylindrical body portion and defining a top and a transition area extending around and connected at a lower end to an upper end of said body portion and connected at an upper end to said top;
   a handling ring integrally-molded with said drum and having a leg member connected to and extending upwardly from generally said upper end of said transition area and a grippable member extending generally outwardly from an upper end of said leg member to define an outer circumferential surface on said handling ring; and
   said transition area having an outside curved surface below and outwardly of the connection to said leg member of said handling ring and of a predetermined radius so that said body portion outer surface is positioned in a tangential plane in close proximity to a tangential plane along said handling ring outer surface.

2. A one-piece blow-molded closed plastic drum comprising:
   a generally cylindrical body portion defining an outer cylindrical surface and an inside surface;
   a bottom integrally-molded with a lower end of said cylindrical body portion;
   a head portion integrally-molded with an upper end of said cylindrical body portion and defining a top having an inside surface and a transition area extending around and connected at a lower end to an upper end of said body portion and connected at an upper end to said top;
   a handling ring integrally-molded with said drum and having a leg member extending upwardly from generally said upper end of said transition area and a grippable member extending generally outwardly from an upper end of said leg member to define an outer circumferential surface on said handling ring; and
   said transition area having an inside curved surface below the connection to said leg member of said handling ring and with at least one predetermined radius so that no acute angles are formed between said inside surfaces of said top, said transition area and said body portion.

3. A one-piece blow-molded closed plastic drum comprising:
   a generally cylindrical body portion defining an outer cylindrical surface and an inside surface;
   a bottom integrally-molded with a lower end of said cylindrical body portion;
   a head portion integrally-molded with an upper end of said cylindrical body portion and defining a top having an inside surface and a transition area extending around and connected at a lower end to an upper end of said body portion and connected at an upper end to said top;
   a handling ring integrally-molded with said drum and having a leg member connected to and extending upwardly from generally said upper end of said transition area and a grippable member extending generally outwardly from an upper end of said leg member to define an outer circumferential surface on said handling ring; and
   said transition area having an outside curved surface below and outwardly of the connection to said leg member of said handling ring and of a predetermined radius so that said body portion outer surface is positioned in a tangential plane in close proximity to a tangential plane along said handling ring outer surface, and said transition area having an inside surface below the connection to said leg member of said handling ring and defining a double ogee with three predetermined radii so that no acute angles are formed between said inside surfaces of said top, said transition area and said body portion.

4. A one-piece blow-molded closed plastic drum comprising:
   a generally cylindrical body portion defining an outer cylindrical surface and an inside surface;
   a bottom integrally-molded with a lower end of said cylindrical body portion;
   a head portion integrally-molded with an upper end of said cylindrical body portion and defining a top having an inside surface and a transition area extending around and connected at a lower end to an upper end of said body portion and connected at an upper end to said top;
   a handling ring integrally-molded with said drum and having a leg member connected to and extending upwardly from generally said upper end of said transition area and a grippable member extending generally outwardly from an upper end of said leg member to define an outer circumferential surface on said handling ring; and
   said transition area having an outside curved surface below and outwardly of the connection to said leg member of said handling ring and of a predetermined radius so that said body portion outer surface is positioned in a tangential plane that is substantially coplanar with a tangential plane along said handling ring outer surface.

5. The one-piece blow-molded closed plastic drum according to claim 4, wherein said transition area has an inside curved surface below the connection to said leg member of said handling ring with at least one predetermined radius so that no acute angles are formed between said inside surfaces of said top, said transition area and said body portion.

6. The one-piece blow-molded closed plastic drum according to claim 4, wherein said transition area has an inside surface below the connection to said leg member of said handling ring that defines a double ogee with three predetermined radii so that no acute angles are formed between said inside surfaces of said top, said transition area and said body portion.

7. A one-piece blow-molded closed plastic drum comprising:
- a generally cylindrical body portion defining an outer cylindrical surface and an inside surface;
- a bottom integrally-molded with a lower end of said cylindrical body portion;
- a head portion integrally-molded with an upper end of said cylindrical body portion and defining a top having an inside surface and a transition area extending around and connected at a lower end to an upper end of said body portion and connected at an upper end to said top;
- a handling ring integrally-molded with said drum and having a leg member connected to and extending upwardly from generally said upper end of said transition area and a grippable member extending generally outwardly from an upper end of said leg member to define an outer circumferential surface on said handling ring; and
- said transition area having an outside curved surface below and outwardly of the connection to said leg member of said handling ring.

8. The one-piece blow-molded closed plastic drum according to claim 7, wherein said transition area has an inside curved surface below the connection to said leg member of said handling ring with at least one predetermined radius so that no acute angles are formed between said inside surfaces of said top, said transition area and said body portion.

9. The one-piece blow-molded closed plastic drum according to claim 7, wherein said transition area has an inside surface below the connection to said leg member of said handling ring that defines a double ogee with three predetermined radii so that no acute angles are formed between said inside surfaces of said top, said transition area and said body portion.

* * * * *